(12) United States Patent
Maritano

(10) Patent No.: US 8,047,245 B2
(45) Date of Patent: Nov. 1, 2011

(54) NON-SKID TYRE COVER

(75) Inventor: Riccardo Maritano, Brescia (IT)

(73) Assignee: Agripool S.r.l. a Socio Unico, Desenzano D/G, Brescia (IT)

( * ) Notice: Subject to any disclaimer, the term of this patent is extended or adjusted under 35 U.S.C. 154(b) by 138 days.

(21) Appl. No.: 12/478,170

(22) Filed: Jun. 4, 2009

(65) Prior Publication Data

US 2009/0301624 A1      Dec. 10, 2009

(30) Foreign Application Priority Data

Jun. 9, 2008   (IT) .............................. BS2008A0119

(51) Int. Cl.
  *B60C 11/00*   (2006.01)

(52) U.S. Cl. ................... 152/213 R; 152/185.1

(58) Field of Classification Search ................. 152/167, 152/170–173, 178–179, 185, 185.1, 187–188, 152/190–191, 213 R, 221–223
See application file for complete search history.

(56) References Cited

U.S. PATENT DOCUMENTS

| | | | | |
|---|---|---|---|---|
| 1,198,552 A | * | 9/1916 | Hutchinson | 152/213 R |
| 1,423,026 A | * | 7/1922 | Rollins | 152/222 |
| 3,233,646 A | * | 2/1966 | Sebena | 152/191 |
| 5,267,596 A | * | 12/1993 | Logar et al. | 152/179 |
| 2003/0131917 A1 | * | 7/2003 | Sakuma | 152/171 |

FOREIGN PATENT DOCUMENTS

| | | | |
|---|---|---|---|
| DE | 141627 | * | 5/1980 |
| JP | 2-95905 | * | 4/1990 |
| JP | 3-70606 | * | 3/1991 |

* cited by examiner

*Primary Examiner* — Jason Bellinger
(74) *Attorney, Agent, or Firm* — Kilyk & Bowersox, P.L.L.C.

(57) ABSTRACT

A non-skid tire cover comprises an annular strip, suitable for covering the tire tread, which comprises a textile portion and at least one ribbed insert, for example in polymeric material.

17 Claims, 4 Drawing Sheets

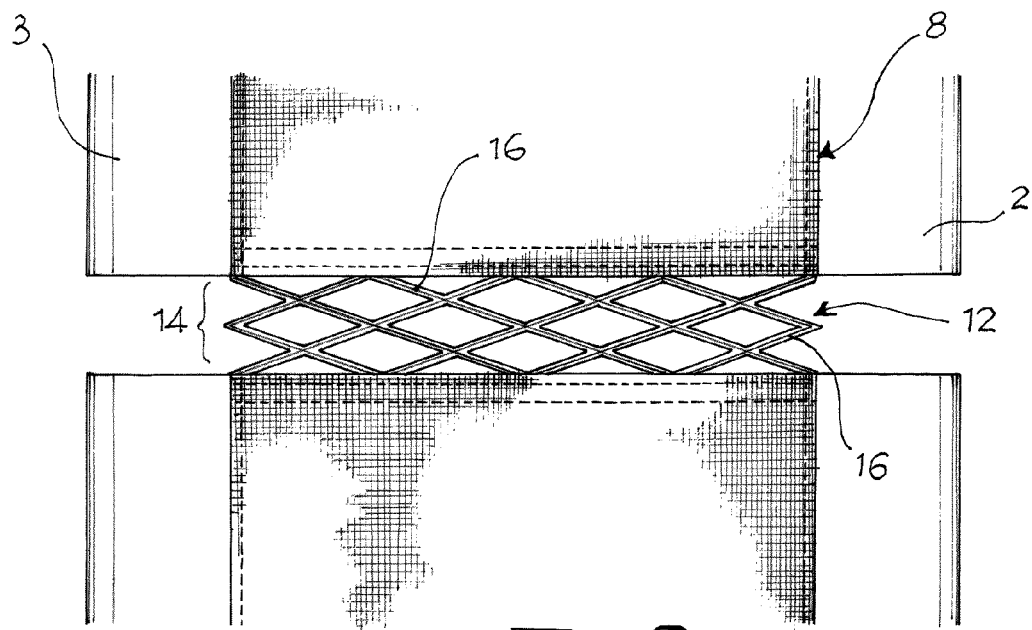
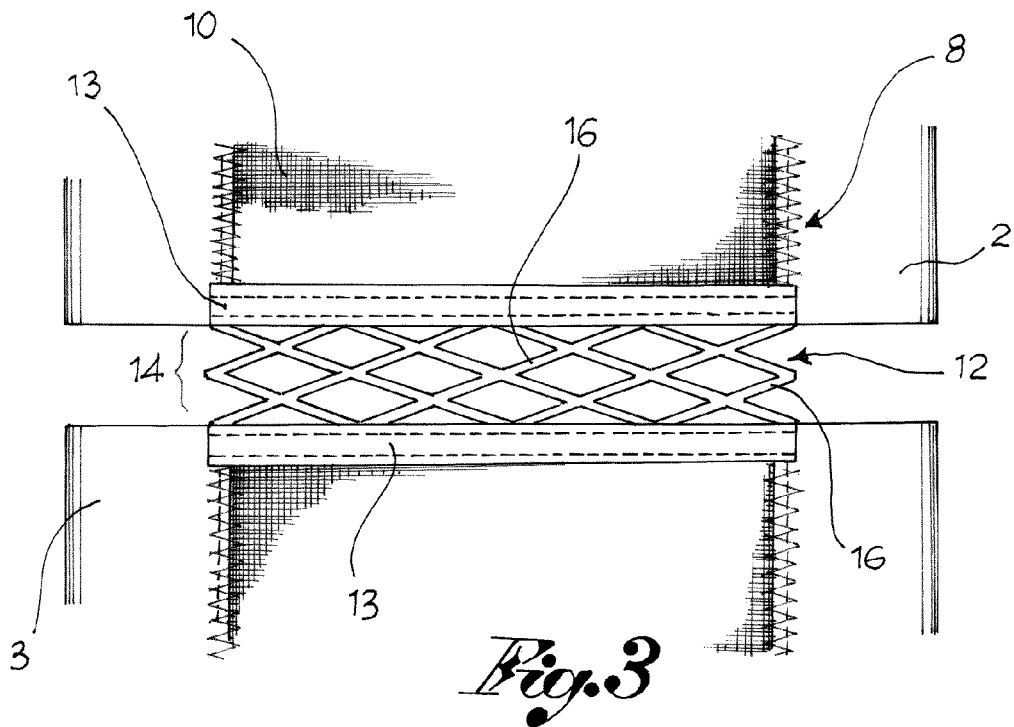

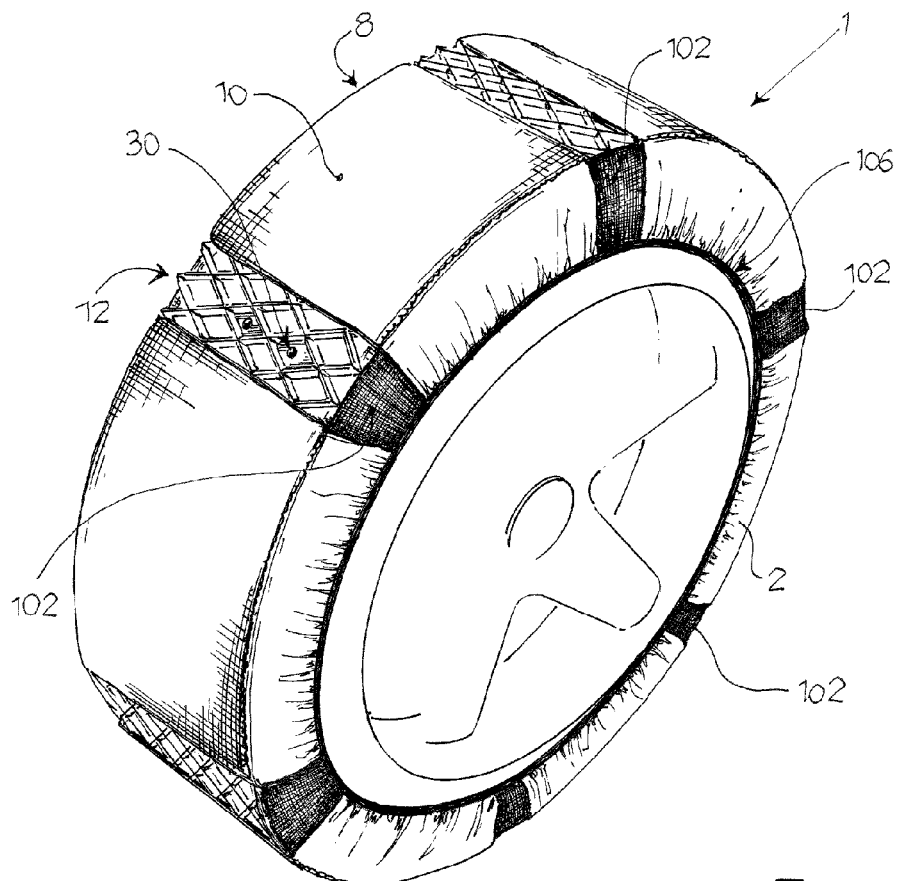
Fig.5
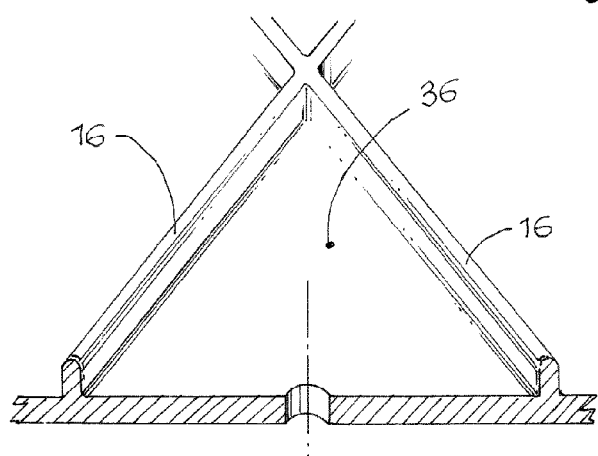
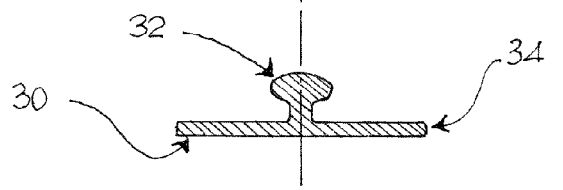
Fig.6

NON-SKID TYRE COVER

This application claims the benefit of earlier filed Italian Patent Application No. BS2008A000119 filed Jun. 9, 2008.

FIELD OF THE INVENTION

This invention concerns a non-skid tyre cover that can be slipped over a tyre to improve road holding on difficult terrain, especially in the presence of snow or ice.

BACKGROUND OF THE INVENTION

One example of embodiment of a tyre cover is described in document WO 2000/059745. Further examples of embodiment are described in International Application WO 2007/039923 and in Italian patent application for invention BS2008A000011, in the name of the Applicant.

These covers must be particularly simple to mount, so that they can be used in bad weather even by non experts, while at the same time guaranteeing considerable reliability so they do not slip off the tyre.

Clearly, a cover is designed for mounting on a grouping of tyres, depending on sizes.

However, with view to reducing the number of sizes, certain covers are hard to mount since the play between cover and tyre is reduced to the minimum.

Sometimes the covers are extendable due to the elastic material of their treads: this facilitates mounting but has the disadvantage of creating a tread with less road holding properties than more rigid ones.

OBJECTS OF THE INVENTION

The purpose of this invention is to create a non-skid tyre cover that has high road holding characteristics and at the same time is easy to mount.

This purpose is achieved by a non-skid cover for tyres comprising an annular strip suitable for covering at least partially the tread of a tyre, wherein the strip comprises at least one textile portion and at least one ribbed insert. The textile portions and the insert are joined in succession to form the strip.

BRIEF DESCRIPTION OF THE DRAWINGS

FIG. 2 shows a plan of part of the cover, from the "outside", i.e. the part towards the terrain during normal use of the cover.

FIG. 3 shows a part of the cover in FIG. 2 from the "inside", i.e. the part towards the tyre.

The figures from 4a to 4c show rib sections of the cover insert.

FIG. 5 shows a cover according to a further embodiment of this invention.

FIG. 6 discloses a detail of the embodiment in FIG. 5.

Figure 1:
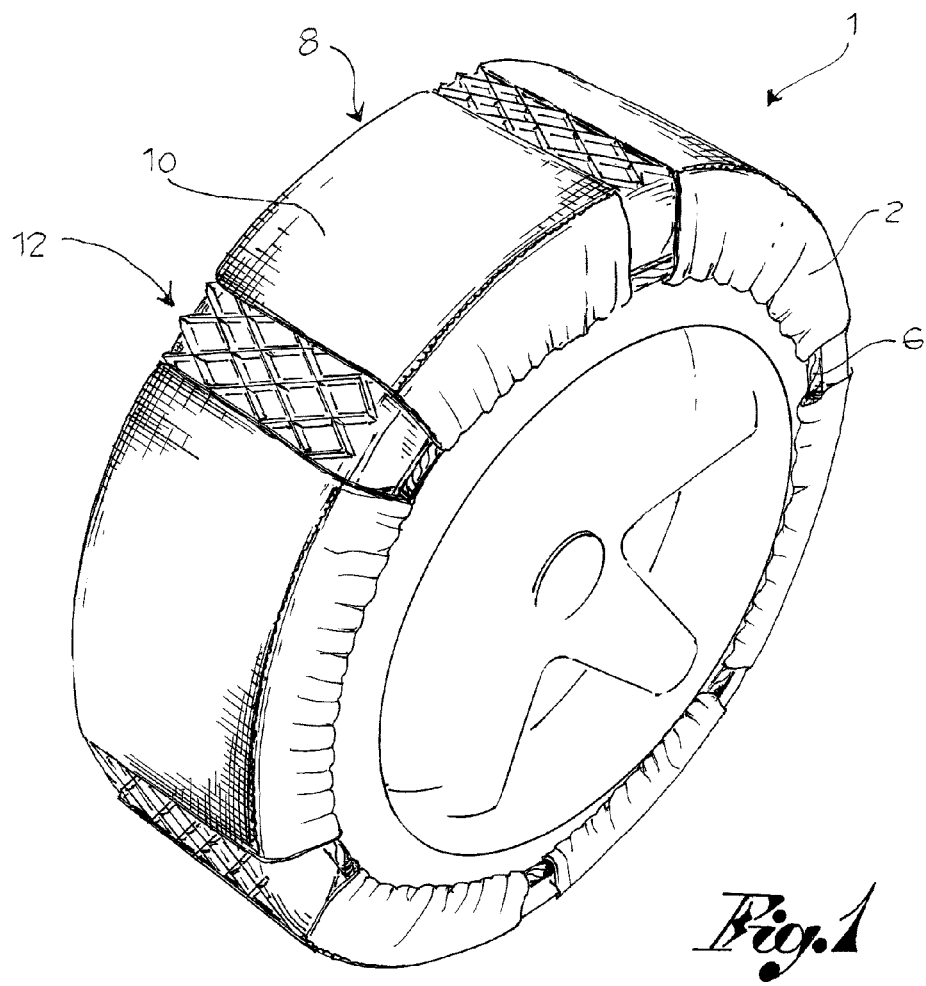
FIG. 1 shows a perspective view of a non-skid cover according to an embodiment of this invention, fitted on a tyre.
Figure 4A:
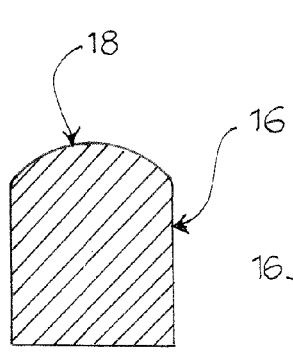
Figure 4B:
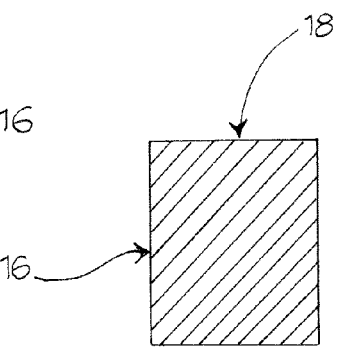
Figure 4C:
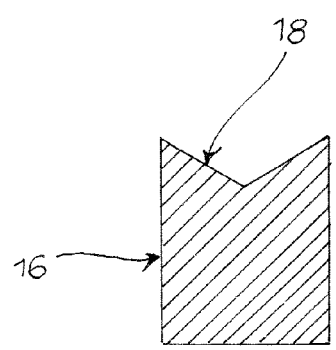
Figure 7:
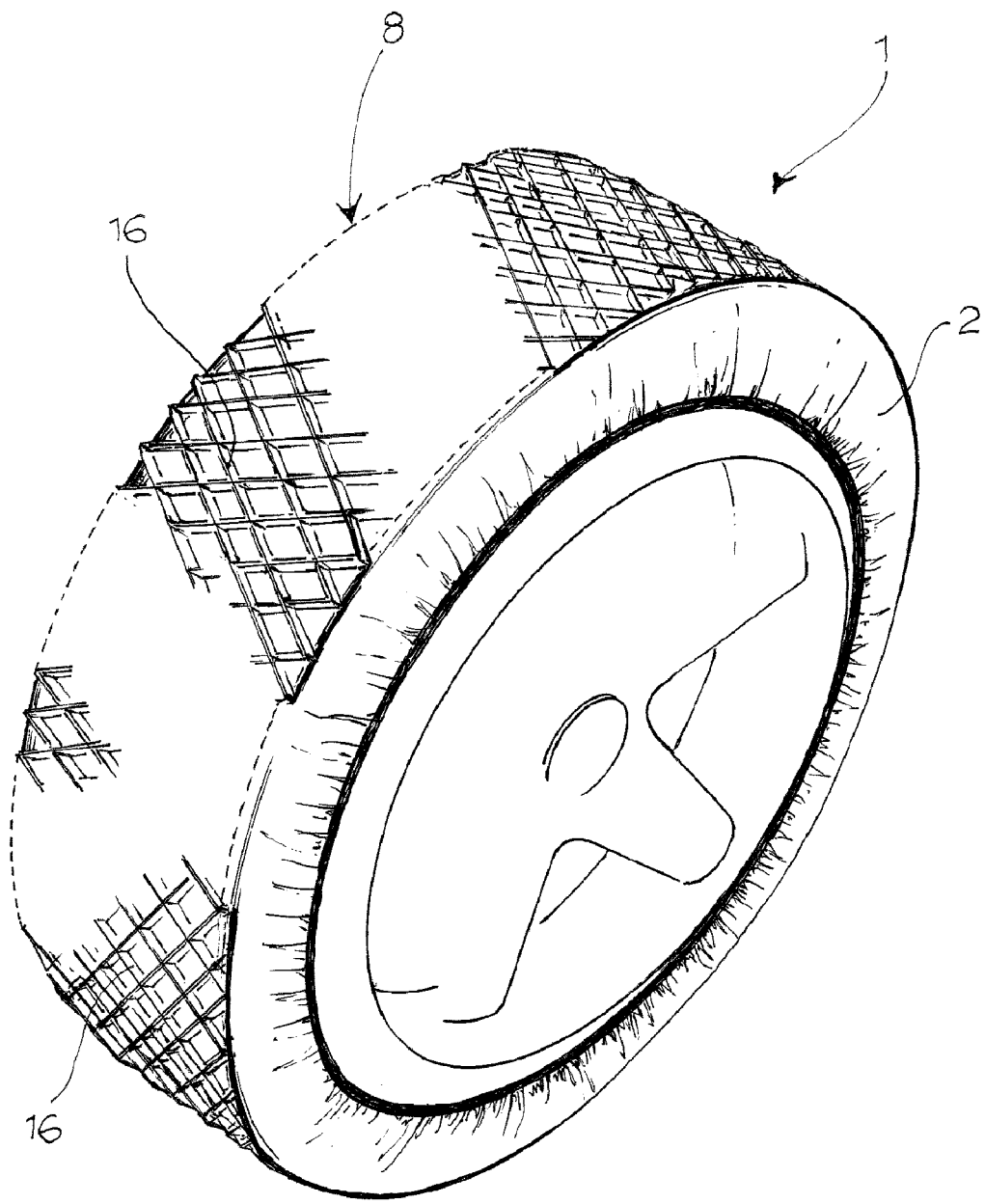

FIG. 7 discloses a cover according to a further embodiment.

DETAILED DESCRIPTION OF THE INVENTION

According to the attached figures, number 1 indicates overall a non-skid cover for tyres, suitable for increasing road holding on difficult terrain, such as in the presence of snow, ice, mud etc.

Cover 1 is slipped over the tyre of a wheel in such a way as to cover at least the tyre tread.

Preferably cover 1 also covers, at least partially, the tyre walls on the inner and outer sides facing the exterior of the vehicle.

Preferably cover 1 includes an annular external side 2, essentially flat and suitable for covering at least partially the external side of the tyre.

Preferably external side 2 comprises a strip in textile material folded in two parts in such a way that an external annular pocket is created between them that runs annularly along the cover.

Preferably, moreover, cover 1 comprises external retaining means suitable for wrinkling the external side in such a way as to retain the cover on the tyre and prevent it slipping off.

For example, the external retaining means comprise elastic elements, for example an elastic cord 6 operating as a spring or an elastic edge 106 joined with the free edge of the external side.

Analogously, cover 1 comprises an internal side 3, an internal annular pocket and internal retaining means.

Furthermore, cover 1 comprises annular strip 8 suitable for covering the tyre tread at least partially.

Strip 8 comprises a rectangular strip with the extremity edges joined to give an annular form.

Preferably strip 8 comprises at least one textile portion 10, in fabric, and at least one insert 12: textile portions 10 and inserts 12 are joined in succession to form the strip.

Preferably, along the circumference of strip 8, a textile portion 10 and an insert 12 are alternated so that each textile portion 10 is united at the circumferential extremities with inserts 12 and each insert 12 is united at the circumferential extremities with two textile portions 10.

Furthermore, at the axial edges the textile portions are joined, to the internal strip and the external strip of the cover respectively, for example by sewing.

In the same way, preferably, the inserts are joined at the axial edges with internal side 3 and external side 2 of cover 1.

The sides, in correspondence to the inserts, are for example interrupted in their circumferential continuity.

According to a further form of embodiment, the external side and/or the internal side may be continuous, i.e. have no interruptions due to sections of elastic strip 102 set in correspondence to inserts 12.

Textile portion 10 is preferably in a knitted fabric, for example made from yarn in polymeric material, for example in polypropylene; preferably the knit is carried out with a Raschel type rectilinear loom.

According to one example of embodiment, the knit is of the open type, meaning such as to have apertures between the yarn weave to allow passage of light, water and air. According to a further example of embodiment, the knit is of the closed type.

According to one variant of embodiment, the strip is in wire mesh.

The surface of the textile portion in contact with the terrain, i.e. the surface creating part of the external surface of the strip, has a weave formed by a succession of crests and valleys, formed by the succession of the knit, set transversally with regard to the moving direction of the cover mounted on the rolling tyre.

Advantageously, the special textile considerably increases road holding since the crests tend to penetrate the snow while the valleys fill up with it, increasing overall the action that the cover can offload on the terrain.

Preferably, moreover, the crests and the valleys are set transversally with regard to the moving direction of the cover 1 mounted on the rolling tyre, at least in part in an inclined direction with regard to the wheel's axis of rotation. For example, the inclination is about 30 sexagesimal degrees.

Advantageously, it has been noted how this setting of the crests and the valleys considerably reduces flapping of the cover at high speeds, thus avoiding it slipping off the tyre.

Preferably insert 12 comprises two connection portions 13 having a prevalently axial extension (with reference to the axis of the tyre or the axis of wheel rotation)in the form of a rectangular belt; the connection portions are joined to the respective textile portions 10, for example by sewing.

Preferably, moreover, insert 12 comprises a main portion 14 which, for example, is set between the connection portions.

Preferably main portion 14 comprises a plurality of ribs 16 which intersect to form loose knits, i.e. with greater apertures than those of the textile portion knit.

In particular the ribs intersect to form a polygonal weave, for example with square or rectangular knit.

Preferably ribs 16 are inclined with regard to the direction of progress of the tyre with which the cover is associated; in other words, the ribs are inclined with regard to the circumferential direction of the strip.

For example, some ribs are inclined in one direction and others in the opposite direction, thus intersecting. For example the ribs, intersecting, form rhomboidal knits.

It is pointed out that, preferably, the main portion 14 of insert 12 has a rib structure which is structurally elastic in the circumferential direction of the strip, inasmuch as the ribs are developed, at least partially, along an axis inclined with regard to the circumferential direction so that the deformability of the main portion 14 derives from the deformation of the rib form and is not due solely to the elastic properties of the rib material.

Preferably the ribs have an inclination of 30 sexagesimal degrees with regard to the circumferential direction of the cover, thus providing the same advantageous aspects mentioned with reference to the inclination of the crests and the valleys of the textile portion fabric.

Preferably, at the intersection between the ribs, the apexes are rounded to safeguard structural reliability.

Preferably the main portion 14 of insert 12 is in polymeric material, for example polyurethane.

Preferably, moreover, also the connection portions 13 of insert 12 are in polymeric material, for example polyurethane.

According to a variant of embodiment, the main portion of the insert is in wire, for example steel.

According to a favoured form of embodiment the connection portions 13 and the main portion 14 are in a single piece.

Preferably, insert 1 comprises protective means suitable for protecting textile portion 10 from rubbing against main portion 14 of insert 12.

According to one form of embodiment, the protective means comprise a protective wall projecting from the connection portion, set between the edge of textile portion 10 which is joined to the connection portion and the terminations of ribs 16 of main portion 14 of insert 12.

According to a further form of embodiment, the protective means comprise a free area set at the confluence of ribs 16 and the connection portion, to space the terminations of the ribs from the edge of textile portion 10.

Preferably the transversal section of a rib 16, i.e. the section obtained through a plane perpendicular to the direction of extension of the rib, has an arched contact rim 18, i.e. the rim that comes into contact with the terrain.

According to further variants of embodiment, the contact rim is flat; according to yet further variants of embodiment, the contact rim is created with an angled line, which is concave.

According to one form of embodiment, cover 1 comprises at least one projection 30 which is rigid (with regard to the rigidity of the insert and/or of the textile portion), projecting from the external surface of the cover (FIGS. 5 and 6).

For example, the projection 30 projects from insert 12.

In one form of embodiment, projection 30 is created with a nail, pointed or otherwise, with a head 32 and a base 34.

The head 32 is inserted through the mesh of insert 12 and projects towards the exterior of the cover, while the base 34 abuts against the interior surface of the insert and against the tyre.

Preferably the meshes bearing projections 30 are blind, i.e. they are closed by a bottom 36.

According to one form of embodiment, cover 1 is completely closed on the external side, for example by a mesh.

Advantageously, the cover according to this invention can be mounted on the tyre simply and rapidly, while at the same time ensuring optimal grip and therefore optimal performance on the terrain.

According to a further advantageous aspect, the cover evinces optimal road holding due to the loose mesh of the insert.

According to yet another advantageous aspect, the cover is highly reliable due to the solid joint between the insert and textile portions and the protection of the textile portion by the ribs of the insert.

Clearly, a specialised technician could carry out modifications of the cover described above with view to satisfying contingent requirements.

For example the insert, in an embodiment, is in steel wire.

According to yet another embodiment, the textile portion is in steel wire mesh.

According to a further embodiment, the cover comprises strip 8 entirely in spaced ribs, in such a way as to form a mesh that covers the tread (FIG. 7).

According to said embodiment, in a first variant the entire strip 8 is a single piece, for example rectangular, whose edges are joined to obtain the annular conformation.

According to said form of embodiment, in a further variant strip 8 is created by joined portions of ribs, for example sewn, to form the annular strip.

These variants are also included in the context of safeguarding defined by the following claims.

The characteristics described and/or represented for one single embodiment should be understood as being applicable also to the other embodiments.

What is claimed is:

1. A non-skid cover for tyres comprising an annular strip suitable for covering at least partially the tread of a tyre, wherein the strip comprises at least one textile portion and at least one ribbed insert, the textile portions and the insert being joined in succession to form the strip, wherein the insert comprises a main portion comprising a plurality of ribs extending along an axis inclined with respect to a circumferential direction of the strip, wherein the insert is a single piece.

2. Cover according to claim 1, wherein the insert comprises polymeric material.

3. Cover according to claim 2, wherein the insert further comprises at least one connection portion for connection to the textile portion, and wherein the main portion comprises an elastic structure.

4. Cover according to claim 1, wherein the ribs intersect to form polygonal meshes.

5. Cover according to claim 1, wherein a transversal section of the rib has a contact edge that is arched or flat or formed by an angled line which is concave.

6. Cover according to claim 1, wherein said insert further comprising protective means for protecting the textile portion from rubbing against the main portion of the insert.

7. Cover according to claim 1, comprising an annular external side comprising textile material folded to form a first annular pocket running annularly along the cover, and an internal side comprising a second annular pocket, wherein the external side and the internal side are suitable for covering the sides of the tyre at least partially.

8. Cover according to claim 1, comprising elastic retaining means to keep the cover in position on the tyre.

9. Cover according to claim 1, wherein the textile portion is sewn to the insert.

10. Cover according to claim 1, further comprising at least one rigid projection projecting externally from the strip.

11. Cover according to claim 1, wherein the textile portion comprises a knitted fabric.

12. Cover according to claim 2, wherein the insert comprises polyurethane.

13. Cover according to claim 1, wherein said ribs are inclined at 30 sexagesimal degrees with respect to the circumferential direction of the strip.

14. Cover according to claim 4, wherein the polygonal meshes are rhomboidal.

15. Cover according to claim 10, wherein the at least one rigid projection projects from the insert.

16. Cover according to claim 11, wherein the textile portion comprises a knitted fabric comprising yarn, wherein the yarn comprises polymeric material.

17. Cover according to claim 1, wherein the textile portion comprises a terrain-contacting surface comprising a weave formed by a succession of crests and valleys set transversely with respect to a moving direction of the cover as mounted on a rolling tyre.

* * * * *